Inventor
Kei Yoshida

Inventor
Kei Yoshida

United States Patent Office 3,264,543
Patented August 2, 1966

3,264,543
SPEED CONTROL DEVICE OF AN AUTOMATIC OPERATING APPARATUS FOR A DOOR OR THE LIKE
Kei Yoshida, % Teraoka Gijutsu Kenkyusho, 395 Yaguchi-machi, Ohta-ku, Tokyo, Japan
Filed Dec. 28, 1962, Ser. No. 248,096
Claims priority, application Japan, Jan. 11, 1962, 37/526
5 Claims. (Cl. 318—266)

This invention relates to a speed control device of an automatic operating apparatus for a door or the like, and more particularly relates to a speed control device of such an automatic forward and backward operating apparatus by which the door is controlled to run at a relatively high speed at the beginning of the operation and at a relatively low speed at the end thereof.

In an automatic door operating device, the opening and closing movements of a door must be stopped at predetermined positions and it is always necessary to decrease the speed of the movement of the door before stopping the door so as to decrease a shock of the stopping or to prevent the door going too far from the stop position. Accordingly it is desirable that a motor working as a prime mover rotates in the order of starting, maximum speed, speed reduction and stopping in both the opening and closing of the door. Similarly, other devices are often required to run at a high speed at the beginning of the running and at a low speed at the end of the running.

Accordingly, one object of this invention is to provide a door operating speed control device which is simple in construction and reliable in operation, making it possible to automatically control the speed of the door in such a manner that the door runs at a high speed at the start of its running and at a low speed at the stop of the motion.

Another object of this invention is to provide an automatic door operating speed control device in which when performing the automatic opening and closing control of a door by the use of a series motor its torque is held substantially constant and the door speed is reduced lower from a predetermined position.

A further object of this invention is to provide an automatic door operating speed control device in which the speed control of a series motor is easily made by adjusting or changing over speed control elements connected in parallel to the armature winding of the series motor thereby decreasing the door speed from a predetermined position to the end of its opening and closing end.

A still further object of this invention is to provide a speed control device in which stopping switches of a series motor and a switch or switches for controlling the changing over speed control elements connected in parallel to an armature winding of the series motor are controlled by a cam mechanism attached onto a rotary shaft or a moving part relating to the movement of a door, thereby easily decreasing the door speed at the end of its opening and closing operation.

Other objects, features and advantages of this invention will become apparent from the following description taken in conjunction with the acompanying drawings in which.

Figure 1:
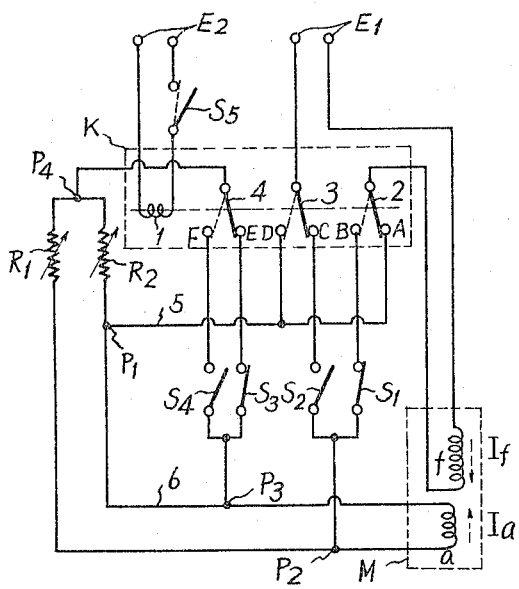
FIGURE 1 is a connection diagram of an embodiment of a speed control device for an automatic door operating apparatus of this invention and shows a condition of the device in the case of a door being closed.

Referring now to FIGURE 1, M is a series motor for driving a door or the like the speed of which is automatically controlled, and $f$ is its field winding and $a$ is an armature winding which are energized by a power source $E_1$. K is a relay which is provided with a coil 1 and movable contacts 2, 3 and 4 to be energized by said coil, said coil 1 being connected to a power source $E_2$ through a starting switch $S_5$. The movable contacts 2 and 3 are used for determining the direction of rotation of the motor M, and the one movable contact 2 cooperates with stationary contact points A and B and the other movable contact 3 cooperates with stationary contact points C and D. The remaining movable contact 4 is employed for controlling the speed of the motor M and cooperates with stationary contact points E and F.

$R_1$ and $R_2$ are speed control elements connected in series to each other and they are resistors in this example. The resistance value of $R_2$ is selected to be sufficiently larger than that of $R_1$ and this series circuit is connected in parallel to the armature winding $a$ with respect to the power source $E_1$.

Figure 2:
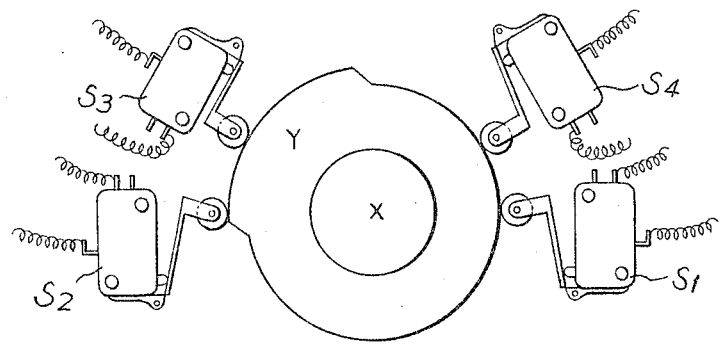
FIGURE 2 is a schematic diagram illustrating the relation between a cam mounted on a door rotatry shaft and switches to be controlled by the cam when the door is closed.

$S_1$ and $S_2$ show motor driving switches for stopping the motor cooperating with the relay contacts 2 and 3 and $S_3$ and $S_4$ are speed controlling switches for changing over a resistor $R_2$. As shown in FIGURE 2, these switches $S_1$ to $S_4$, inclusive, are disposed around a cam Y mounted on the rotary shaft of a door or a rotary shaft X associated therewith and they are so constructed that their switching is controlled by the cam.

Now I will hereinafter explain connections between the aforementioned parts with reference to FIGURE 1. That is, the right end of the power source $E_1$ is connected to one end of the field winding $f$ and the other end of the field winding $f$ is connected to the movable contact 2. The left end of the power source $E_1$ is connected to the movable contact 3. The stationary contact points A and D are both connected to one terminal $P_1$ of the armature winding through a lead line 5 and the stationary contact points B and C are connected to the other end $P_2$ of the armature winding $a$ respectively through the switches $S_1$ and $S_2$ and other stationary contact points E and F are connected respectively through the switches $S_3$ and $S_4$ to a point $P_3$ where the aforesaid side $P_1$ of the armature and a lead wire 6 are connected. As previously described, the resistors $R_1$ and $R_2$ are connected in series to each other and this series circuit is connected in parallel to the armature winding $a$ with respect to the power source. The connection point $P_4$ of the resistors $R_1$ and $R_2$ is connected to the movable contact 4.

Operations of the device of this invention will hereinbelow be explained. FIGURE 1 illustrates the condition of the circuit connection in the case of the door being closed. The relation between the cam Y and the switches $S_1$ to $S_4$, inclusive, in this case is as shown in FIGURE 2. Namely, the respective movable contacts 2, 3 and 4 are respectively in contact with the stationary contact points A, C and E as shown by the solid line, and the switches $S_1$ and $S_3$ are closed and other ones $S_2$ and $S_4$ are open. When opening the door, the switch $S_5$ is closed to flow a current to the relay coil 1. This switch $S_5$ may be hand- or automaticaly-operated. For example, this switch can be operated photoelectrically in accordance with the position of a man. In response to the closing of the switch $S_5$ the relay 1 begins to operate and its movable contacts 2, 3 and 4 are changed over as shown by the dotted line. As a result of this, the following circuit is formed;

$$E_1-f-2-B-S_1 < \begin{matrix} P_2-a-P_3-6-P_1-5-D-3-E^1 \\ P_2-R_1-R_2-P_1-5-D-3-E_1 \end{matrix}$$

The field winding current $I_f$ and the armature winding current $I_a$ flow instantaneously in the direction of the arrows of the solid line as shown in FIGURE 1 and the motor begins to revolve in the direction for opening the door, namely in the forward direction. However, since the value of the resistor $R_2$ is sufficiently larger than that of the resistor $R_1$ and the entire value of the resistors $R_1$ and $R_2$ is considerably large, the currents $I_f$ and $I_a$ are of substantially equal value, so that the motor begin to rotate at a predetermined relatively high speed.

Figure 3:
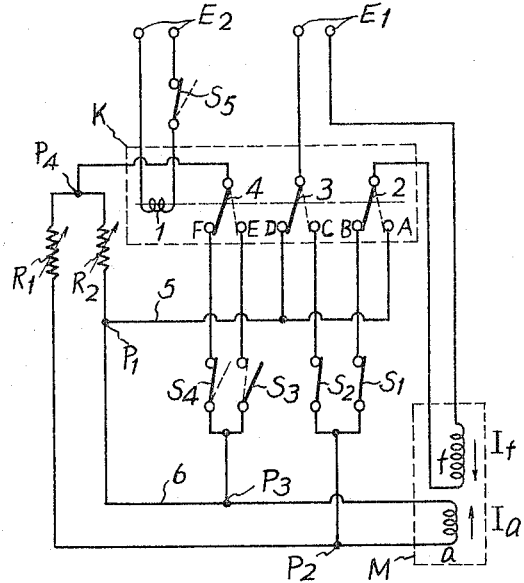
FIGURE 3 shows the condition of connection diagram when a door is opened at a certain revolution angle and the opening speed of the door is decreased from this point.
Figure 4:
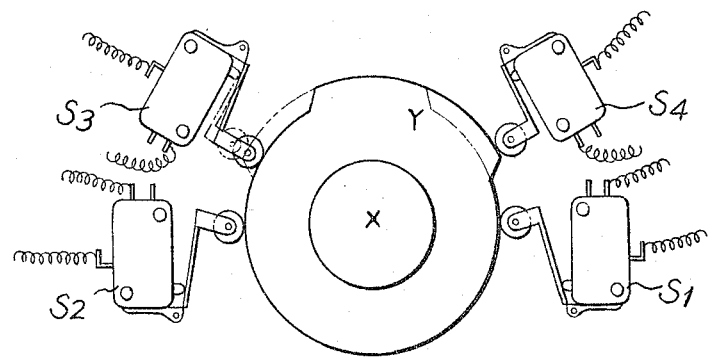
FIGURE 4 is a schematic diagram illustrating the relative position of the cam and the switches in the case where switches $S_1$ to $S_4$, inclusive, shown in FIGURE 3 are in the opening and closing control conditions.

When the door is turned open to the position shown in FIGURE 4, the switches $S_1$, $S_2$ and $S_4$ are closed and the last one $S_3$ is open as illustrated by the solid line in FIGURE 3. However, it must be noted here that the switching operation of the switches $S_2$ and $S_3$ from their respective conditions of FIGURE 1 is irrespective of the general operation because the contact points C and E are opened. First of all, the closing of the switch $S_4$ is a problem, and hence the resistor $R_2$ is short-circuited by the following circuit:

$$P_1-6-P_3-S_4-F-4-P_4$$

Figure 6:
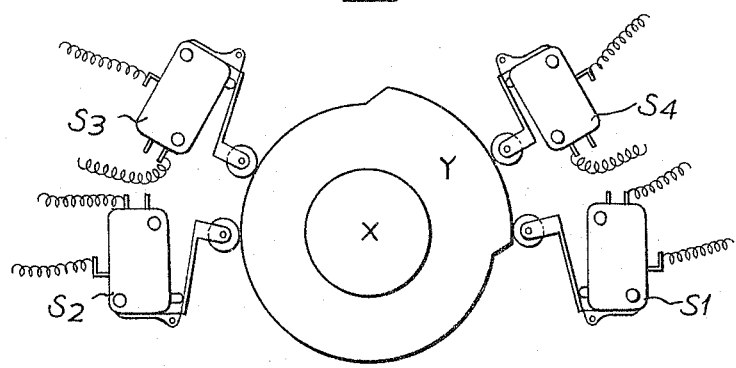
FIGURE 6 is a schematic diagram illustrating the relative position of the cam and switches in the case of the opening and closing control of the switches $S_1$ to $S_4$, inclusive, shown in FIGURE 5.

Consequently, the resistor $R_2$ of the series circuit connected in parallel to the armature winding $a$ is short-circuited. Accordingly, the current $I_a$ flowing to the armature $a$ becomes smaller, and on the contrary the current $I_f$ becomes larger so that the field magnetic flux becomes also large, and the rotation speed of the motor is reduced with the torque kept constant. Thus, the door opening operation is completed at such a low speed. The relation between the cam Y and the switches $S_1$ to $S_4$, inclusive, in this case is as shown in FIGURE 6.

Figure 5:
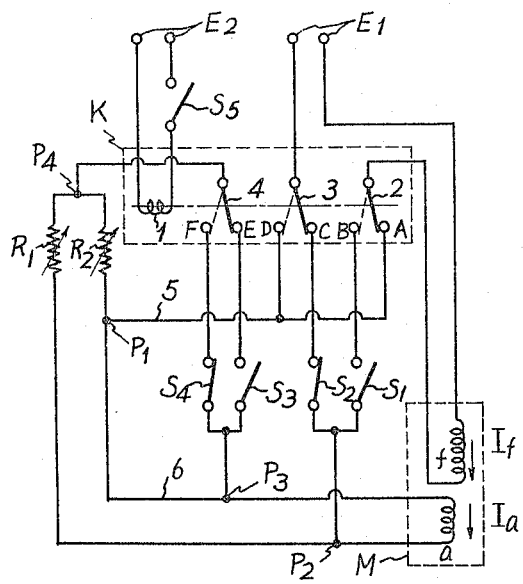
FIGURE 5 is a connection diagram showing the condition of the start for the door closing operation.

The closing operation of the door from the opening condition will hereinafter be explained. First, the switch $S_5$ is opened to cut off the energization of the relay 1. Then, the circuit is in the same condition as that shown in FIGURE 5 and the movable contacts 2, 3 and 4 return to their initial positions as illustrated by the solid line in FIGURE 1. In this case, however, the switches, $S_1$ to $S_4$, inclusive, are as shown in FIGURE 5, different from those in FIGURE 1, and the following circuit is formed.

$$E_1-f-2-A-P_1-6-P_3-a-P_2-S_2-C-3-E_1$$

As a result of this, a current flows instantaneously to the armature $a$ in the opposite direction to the previous one and the motor is reversed. In this case, since the series circuit composed of the resistors $R_1$ and $R_2$ is inserted in parallel in the armature $a$, the motor begins to close the door at a high speed. Then, when the door is closed to some revolution angle the cam Y becomes as shown by the dotted line in FIGURE 4 and the switch $S_3$ is closed and the switch $S_4$ is opened. FIGURE 3 shows this condition. Accordingly, the switch $S_3$ short-circuits the resistor $R_2$ and the speed of the door closing operation is reduced before the door is completely closed in the same manner as that previously described.

Figure 7:
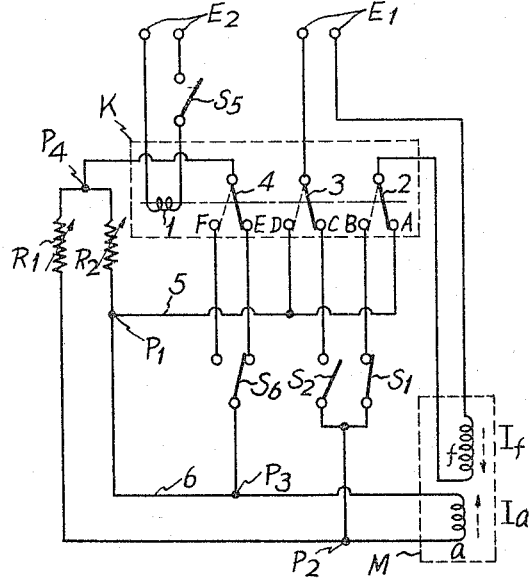
FIGURE 7 is an electrical connection diagram showing another example of this invention.

FIGURE 7 illustrates an example in which the switches $S_3$ and $S_4$ are replaced with one switch $S_6$ and other parts are all the same in the embodiment of FIGURE 1. Therefore, parts corresponding to those in FIGURE 1 are marked with the same numeral references and their detailed explanations are omitted for the sake of simplicity. This example may be employed in the case where the door speed is controlled to be high by the first 45° and to be low by the latter 45° of its movement, as compared with the previous example in which the door speed is high by the first 30° and becomes low by the latter 60° of the movement.

Figure 8:
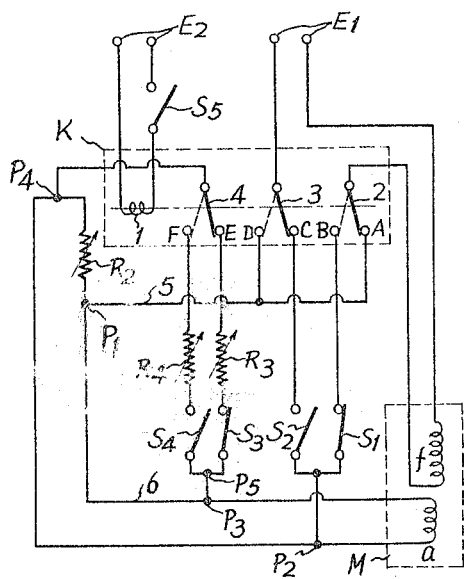
FIGURE 8 is an electrical connection diagram showing a further embodiment of this invention.

FIGURE 8 shows another example of this invention, wherein the resistor $R_1$ is dispensed with and resistors $R_3$ and $R_4$ are respectively inserted in series with the switches $S_3$ and $S_4$ between the stationary contact points E, F and the connection point $P_5$ of the switches $S_3$ and $S_4$ in FIGURE 1, the value of the resistor $R_2$ being greater than that of the resistors $R_3$ and $R_4$, which latter resistors have nearly equal resistance. In this connection the resistors $R_3$ and $R_4$ is connected in parallel to the resistor $R_2$ through the switches $S_3$ or $S_4$ so that the speed reduction of the forward and backward direction of the motor M can be independently controlled as desired.

Figure 9:
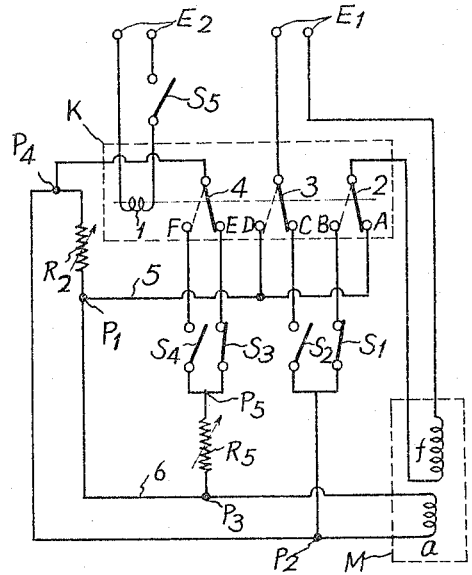
FIGURE 9 is an electrical connection diagram showing a still further embodiment of this invention.

FIGURE 9 is an electrical connection diagram showing a still further embodiment of this invention, in which the resistors $R_3$ and $R_4$ are dispensed with and a resistor $R_5$ is inserted between the points $P_3$ and $P_5$ in FIGURE 8. But it will be apparent that the resistor $R_5$ can also be inserted between the point $P_4$ and the movable contact 4. In this case, the resistor $R_2$ is shunted by the resistor $R_5$, whereby substantially the same speed control can be attained as shown in the connection of FIGURE 1.

Figure 10:
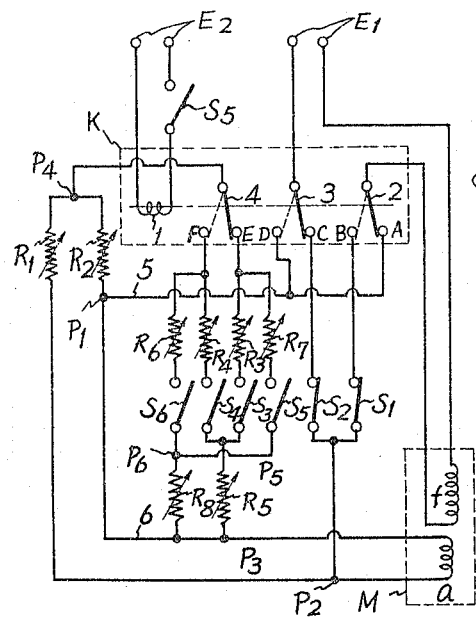
FIGURE 10 is an electrical connection diagram showing another embodiment of this invention.

FIGURE 10 is an electrical circuit diagram of another embodiment of this invention in which the embodiments shown in FIGURES 1, 8 and 9 are combined with additional circuits 7 and 8 respectively controlled by cam switches $S_5$ and $S_6$. A resistor $R_7$ is inserted in the circuit 7, a resistor $R_6$ in the circuit 8 and a resistor $R_8$ between the connection point $P_6$ of the cam switches $S_5$, $S_6$ and the point $P_3$. As shown in the drawing, the circuit $R_7-S_5-R_8$ is connected in parallel to the circuit $R_3-S_3-R_5$ and the circuit $R_6-S_6-R_8$ is connected in parallel to the circuit $R_4-S_4-R_5$.

In this connection speed reduction control both the forward and backward direction of the motor M can be obtained in two steps. The relationship of the values of the respective resistors can, for example, be selected as $$R_2 > R_7 + R_8 > R_3 + R_5 \text{ and } R_2 > R_6 + R_8 > R_4 + R_5$$

Figure 11:
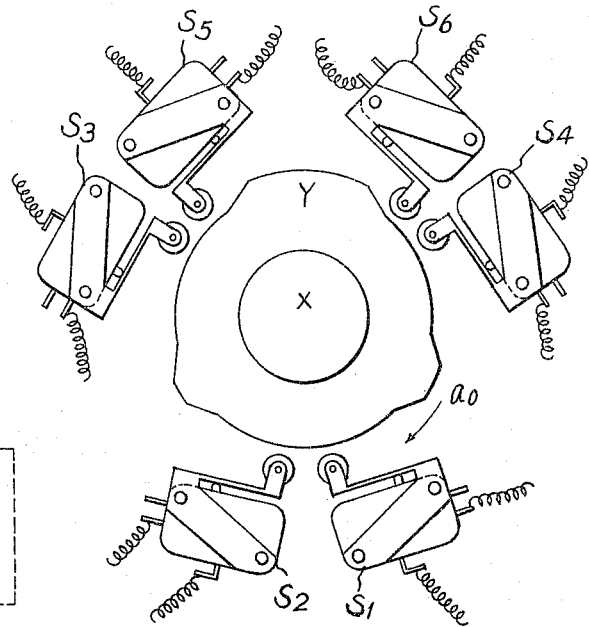
FIGURE 11 shows a diagram illustrating the relative position of the cam and switches in case of the opening and closing control of the switches $S_1$ to $S_6$, inclusive, shown in FIGURE 10.

The cam switches $S_1$ to $S_6$, inclusive, can be arranged as shown in FIGURE 11, where the cam is positioned at a point of the backward direction represented by the arrow $a_0$. Accordingly switch $S_6$ is closed so that the resistor $R_2$ is shunted by the resistors $R_6 + R_8$ to reduce the speed of the motor M to some extent and then switch $S_4$ is closed so that the resistor $R_2$ is also shunted by the resistors $R_4 + R_5$ to control the speed more slowly. On the contrary, the switch $S_5$ is firstly closed and the resistor $R_2$ is shunted by the resistors $R_7 + R_8$ to reduce the speed to some extent and then the switch $S_3$ is closed so that the resistor $R_2$ is also shunted by the resistors $R_4+R_5$ to make the speed reduction more effectively.

As apparent from the forgoing description, the speed control can easily be varied if the value of the above resistor or resistors is selected as desired. It will be noted that some of the resistors can be removed from their circuit so as to make the examples shown in FIGURES 1, 8 and 9.

Although the above description has been made in connection mainly with an ordinary swinging door, this invention can equally be applied to a sliding door by arranging the cam and the cam switches on a line along the sliding direction of the sliding door.

In some cases the cam can be mounted on a rotary shaft which is associated with a sliding door and in this case the cam switches can be arranged to the cam with the same relationship as illustrated in the forgoing figures.

It will also be apparent that all or one part of the resistors used in the above embodiment can be replaced by inductance, capacitance, their combination or the combination with a resistor generally as impedances in case of using an alternating current source.

In accordance with this invention, by the speed control of the motor, a door is opened and closed at a high speed for its first predetermined movement and at a low speed for the latter and then the door is completely stopped. Furthermore, since the torque of the motor is not deceased by this speed control, a door is stably driven even if it is pressed by external force such as wind pressure. When the resistance value of $R_2$ is increased to be extremely large, its result closely resembles to that without $R_2$, but the same effect is obtained.

It will be apparent that many modifications and variations may be effected without departing from the scope of the novel concept of this invention.

What is claimed is:

1. A system for automatically controlling the operation of a door or the like comprising:
   a motor having series field and armature windings,
   resistance means in parallel with said armature windings,
   shaft means connecting said motor to the door for movement thereof,
   cam means mounted on the said shaft means for rotation therewith,
   relay means in circuit with said motor for reversing the direction of rotation,
   first and second drive switch means in circuit with said motor and in abutted relation with said cam means for actuation thereby,
   first and second control switch means in circuit with said armature winding and said resistance means in abutted relation with said cam means for actuation thereby,
   said first control switch means and said first drive switch means actuated closed and opened respectively and in sequential order by said cam means to short circuit a portion of said resistance means thereby slowing the speed of said motor before the door is fully open at which time the said motor is deenergized,
   said second control switch means and said second drive switch means actuated closed and open respectively and in sequential order by said cam means for short circuiting a portion of said resistance means thereby slowing the speed of said motor before the door is fully closed, at which time said motor is deenergized, and
   contact means on said relay means for removing said short circuit from said portion of said resistor when the door is actuated open from its full closed position and when the door is actuated closed from its full open position.

2. The system of claim 1 in which said resistance means comprises:
   two resistors having a different value connected in series, the larger one of said resistors being short circuited by said first and second contact switches near the fully open and fully closed positions respectively.

3. A system for automatically controlling the operation of a door or the like comprising:
   a motor having a series field and armature windings,
   a first resistance means in parallel with the said armature winding,
   shaft means connecting said motor to the door for movement thereof,
   cam means mounted on said shaft means for rotation therewith,
   relay means in circuit with said motor for reversing the direction of rotation,
   first and second drive switch means in circuit with said motor and in abutted relation with said cam means for actuation thereby,
   first and second control switch means in circuit with said armature winding and said resistance means and in abutted relation with said cam means for actuation thereby,
   second and third resistance means in parallel with said first resistance means and in circuit with said first and second control switch means for shunting said first resistance means when either of said first and second control switch means are actuated closed,
   said first control switch and said first drive switch actuated closed and opened respectively and in sequential order by said cam means to shunt said first resistance means with said second resistance means thereby slowing the speed of said motor before the door is fully opened at which time said motor is deenergized,
   said second control switch means and said second drive switch means actuated closed and opened respectively and in sequential order by said cam means to shunt said first resistance means with said third resistance means and thereby slowing the speed of said motor before the door is fully closed at which time said motor is deenergized, and
   contact means on said relay means for removing said second and third shunt resistors from shunting said first resistance means when the door is actuated open from its full closed position and when the door is actuated closed from its full open position.

4. The system of claim 3 in which said second and third resistance means are combined in a single resistance means adapted to shunt said first resistance means upon actuation of either of the said first or second control switches depending upon the position of said contact means on said relay means.

5. A system for automatically controlling the operation of a door or the like comprising:
   a motor having a series field and armature windings,
   a first resistance means in parallel with said armature winding,
   shaft means connecting the said motor to the door for movement thereof,
   cam means mounted on said shaft means for rotation therewith,
   relay means in circuit with said motor for reversing the direction of rotation,
   first and second drive switch means in circuit with said motor and in abutted relation with said cam means for actuation thereby,
   a plurality of control switch means for controlling the deceleration of said motor in either direction of rotation,
   said control switch means each having a resistance in series therewith and each in abutted relation with said cam means for sequential actuation thereby, certain ones of said control switch means and said first drive switch means actuated in a sequential order by said cam means to shunt said first resistance means in sequential order thereby progressively slowing the speed of said motor thereby reducing the momentum of the door before the door is fully open, certain other ones of said control switch means and said second drive switch means actuated in a sequential order by said cam means to shunt said first resistance means in a sequential order thereby progressively slowing the speed of the said motor thereby reducing the momentum of the door before the door is fully closed, and contact means on said relay means for removing said shunting resistors from circuit with the said first resistance means when the door is actuated open from its fully closed position and when the door is actuated closed from its fully open position.

References Cited by the Examiner

UNITED STATES PATENTS

| | | | |
|---|---|---|---|
| 861,790 | 7/1907 | Von Zweigbergk | 318—250 |
| 2,696,579 | 12/1954 | Van der Veer | 318—250 |

ORIS L. RADER, *Primary Examiner.*

S. GORDON, D. F. DUGGAN, *Assistant Examiners.*